Sept. 26, 1961　　　M. WOJCIECHOWSKI　　　3,001,221
WINDSHIELD WIPER BLADE AND METHOD FOR MAKING SAME
Filed Dec. 10, 1956
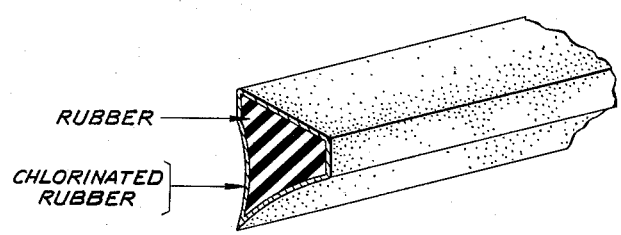
INVENTOR.
Mieczyslaw Wojciechowski
BY
ATTORNEY.

United States Patent Office 3,001,221
Patented Sept. 26, 1961

3,001,221
WINDSHIELD WIPER BLADE AND METHOD FOR MAKING SAME
Mieczyslaw Wojciechowski, Detroit, Mich., assignor to General Motors Corporation, Detroit, Mich., a corporation of Delaware
Filed Dec. 10, 1956, Ser. No. 627,480
8 Claims. (Cl. 15—250.36)

This invention relates to a new and improved windshield wiper blade for automotive vehicles and the like, and to a process for making same.

The qualities which a windshield wiper blade should have, to be ideal, are: flexibility, durability, a low coefficient of friction on wet or semi-wet glass, and surface hardness with accompanying high abrasion resistance. It would appear that some of these ideal characteristics such as surface hardness and flexibility are mutually opposed and that compromise is therefore necessary. The fact is that the rubber blades in current use constitute such a compromise, durability, surface hardness and low coefficient of friction being sacrificed in order to attain the flexibility which is essential in order that the blade rapidly conform to changes in contour as it moves over the surface of the windshield. The problem has become more difficult with the trend toward complex curved windshields.

The present invention provides a windshield wiper blade which has a very low coefficient of friction on wet and semi-wet glass, highly increased surface hardness, abrasion resistance and durability, and yet which has very high flexibility. In its broadest scope the invention comprehends a windshield wiper blade comprising a rubber body with a thin hard surface coating of chlorinated rubber.

The accompanying drawing shows a perspective view with portions broken away of a windshield wiper blade constructed in accordance with the invention. It will be understood, of course, that the blade shown fits into a suitable metal blade support to which there is secured the usual pivotable arm for operation of the blade over the vehicle windshield. The precise shape of the blade shown is not important to the invention.

The term "rubber" as used herein to described and define the blade body is intended to include not only natural rubber but also the various synthetic elastomers which have essentially the same physical characteristics as natural rubber and which are therefore commonly referred to as synthetic rubbers. Examples are polychloroprene, polybutadiene-styrene and butyl rubber. The rubber, whether natural or synthetic, must, of course, be vulcanized or polymerized, as the case may be, to the extent necessary to provide the necessary body strength and flexibility for the blade. Generally, the blade body material, and particularly where it is of natural rubber, will contain the usual reinforcing carbon black, vulcanizer and other minor ingredients normally used in processing.

The term "chlorinated rubber" is intended to include those compositions which result from the chlorination of natural rubber to thereby cause substitution of chlorine for some of the hydrogen atoms in the rubber polymer. Such compositions are well known in the art and may contain as high as about 70% by weight chlorine. Lower degrees of chlorination are, of course, also possible. An example of chlorinated rubber is Parlon, currently marketed by the Hercules Powder Company, which contains about 67% by weight chlorine.

The hardness of chlorinated rubber increases with chlorine content and since one of the chief functions of the chlorinated rubber coating on the windshield wiper blade of the present invention is to provide increased surface hardness, it is highly desirable that the chlorinated rubber used as the coating contain at least 40% by weight chlorine. For best results from the standpoint of obtaining maximum hardness without significant sacrifice in any of the other necessary characteristics, the chlorinated rubber should contain from about 60% to 70% by weight chlorine. Such chlorinated rubber can have a hardness approaching that of glass.

It is important that the coating of chlorinated rubber be thin since with a thick coating the hard surface gained is accompanied by a decrease in flexibility which is highly disadvantageous not only because it interferes with the ability of the blade to conform to the windshield contours but also because it results in cracks and fissures in the coating from the flexing that does occur, thereby greatly decreasing the life of the blade. Preferably the coating of chlorinated rubber should not exceed about .002 inch in thickness, particularly where the coating contains in excess of about 60% chlorine. A thin coating of chlorinated rubber provides a surface which is hard and yet which is flexible. In the accompanying drawing the thickness of the coating is, of course, greatly exaggerated.

The chlorinated rubber coating may be applied to the rubber windshield wiper blade by dipping the blade into a solution of the chlorinated rubber in a solvent such as ethyl acetate toluene or other suitable solvent.

Though not essential, it is generally preferable to slightly chlorinate the surface of the rubber blade body before the chlorinated rubber coating is applied, this in order to obtain optimum adhesion of the chlorinated rubber coating to the rubber blade. The following is an example of the preferred method for manufacturing the improved windshield wiper blades. First, a natural rubber, suitably vulcanized and processed, is formed into the blade base portion by any of the methods well known in the art, i.e., extrusion, molding, or the like usually followed by trimming. If the formed rubber blade has any wax or the like on its surface from the forming process, it should be removed by washing with acetone or other suitable solvent. After forming, or washing if necessary, the blade is subjected to gaseous chlorine at about room temperature (in the neighborhood of 75° F.) and at about atmospheric pressure for a period of about 15 seconds. Then the blade is dipped for a few seconds into a solution of chlorinated rubber in ethyl acetate, toluene or the like. After the blade is removed from the chlorinated rubber solution it is allowed to dry and is then ready for use.

The thickness of the chlorinated rubber coating obtained is, of course, dependent upon the concentration of the solution used and since a thin coating is desired, a dilute solution should be employed. An excellent thin hard coating on a natural rubber blade (preferably chlorinated as indicated above) may be obtained by using a 2% to 3% by weight solution of chlorinated rubber in ethyl acetate, the chlorinated rubber containing from 60% to 70% by weight chlorine. Slightly different solution concentrations may be desirable where the blade body being coated is a synthetic rather than natural rubber. For example, where the blade base consists of neoprene or butyl rubber, a .5% to 1% solution of the chlorinated rubber is preferable to obtain the desired thin coating.

While advantages of the invention may be obtained by coating only the wiping surface of the blade with the chlorinated rubber, it is preferable and also generally more economical from the processing standpoint to completely immerse the blade in the chlorinated rubber solution to coat all surfaces.

As indicated above, it is not essential to use the strike chlorination treatment prior to coating with the chlorinated rubber; but it is usually advantageous in that it provides for a better bond between the chlorinated rubber and the blade base. Where such chlorination is utilized, it should be very brief, i.e., on the order of only a number of seconds, so as to cause no significant increase in hardness or decrease in flexibility.

In accordance with the present invention a hard durable wiper blade surface is provided by the thin coating of chlorinated rubber, which is applied as such, and there is no significant sacrifice in flexibility. The hard coating, in addition to being highly resistant to abrasive wear, also provides a surface which has an extremely low coefficient friction on a wet or partially wet windshield. While of less importance than the above, another advantage of the windshield wiper blades made in accordance with the present invention is that they have a very neat and attractive appearance resulting from the finish provided by the chlorinated rubber coating.

While the invention has been described with particular reference to preferred embodiments thereof, it is to be understood that various modifications are possible all within the intended scope of the claims which follow.

I claim:

1. A windshield wiper blade comprising an elongated, flexible rubber body and a coating on said rubber body of a thin hard layer consisting of chlorinated rubber containing at least 40% by weight chlorine to provide said blade with increased surface hardness and abrasion resistance, said layer not exceeding .002 inch in thickness and thereby being freely flexible with said rubber body.

2. A windshield wiper blade comprising an elongated, flexible rubber body and a coating on said rubber body of a thin hard layer consisting of chlorinated rubber containing from 60% to 70% by weight chlorine to provide said blade with increased surface hardness and abrasion resistance, said layer not exceeding .002 inch in thickness and thereby being freely flexible with said rubber body.

3. A windshield wiper blade comprising an elongated, flexible rubber body having a slightly chlorinated surface and a coating over said surface of a thin hard layer consisting of chlorinated rubber containing at least 40% by weight chlorine to provide said blade with increased surface hardness and abrasion resistance, said layer not exceeding .002 inch in thickness and thereby being freely flexible with said rubber body.

4. A windshield wiper blade comprising an elongated, flexible rubber body having a slightly chlorinated surface and a coating over said surface of a thin hard layer consisting of chlorinated rubber containing from 60% to 70% by weight chlorine to provide said blade with increased surface hardness and abrasion resistance, said layer not exceeding .002 inch in thickness and thereby being freely flexible with said rubber body.

5. A method for making a windshield wiper blade including the step of applying to an elongated flexible rubber blade body a dilute solution of up to about 3% by weight chlorinated rubber in a solvent, said chlorinated rubber containing at least 40% by weight chlorine, and then allowing said solvent to evaporate from said blade body to thereby coat the surface of said blade body with a thin hard layer, not exceeding .002 inch in thickness, of said chlorinated rubber.

6. A method for making a windshield wiper blade comprising the steps of subjecting an elongated flexible rubber blade body to gaseous chlorine for a short period to slightly chlorinate the surface thereof, immersing said blade body into a solution of up to about 3% by weight chlorinated rubber in a solvent, said chlorinated rubber containing at least 40% by weight chlorine, and then allowing said solvent to evaporate from said blade body to thereby coat the surface of said blade body with a thin hard layer, not exceeding .002 inch in thickness, of said chlorinated rubber.

7. A method for making a windshield wiper blade comprising the steps of immersing an elongated flexible rubber blade body into a solution of not in excess of about 3% by weight chlorinated rubber in a solvent, said chlorinated rubber containing from 60% to 70% by weight chlorine, and then allowing said solvent to evaporate from said blade body to thereby coat the surface of said blade body with a thin hard layer of chlorinated rubber.

8. A method for making a windshield wiper blade including the steps of subjecting an elongated flexible rubber blade body to gaseous chlorine for a period on the order of about 15 seconds at room temperature and at atmospheric pressure, immersing said blade body into a solution of chlorinated rubber in a solvent, said chlorinated rubber containing from 60% to 70% by weight chlorine and said solution containing from about 2% to 3% by weight of chlorinated rubber, and then allowing said solvent to evaporate from the blade body to thereby coat said blade body with a thin hard layer of chlorinated rubber.

References Cited in the file of this patent

UNITED STATES PATENTS

| | | |
|---|---|---|
| 1,825,376 | Vaughn | Sept. 29, 1931 |
| 1,919,766 | Beal | July 25, 1933 |
| 1,940,329 | Shierk | Dec. 19, 1933 |
| 1,948,292 | Geer | Feb. 20, 1934 |
| 1,971,439 | Arnold | Aug. 28, 1934 |
| 1,978,633 | Horton | Oct. 30, 1934 |
| 2,015,165 | Twiss et al. | Sept. 24, 1935 |
| 2,114,251 | Koch | Apr. 12, 1938 |
| 2,115,053 | Winkelmann | Apr. 26, 1938 |
| 2,126,733 | Cott | Aug. 14, 1938 |
| 2,132,268 | Mallard | Oct. 4, 1938 |
| 2,596,878 | Van Veerson | May 9, 1950 |
| 2,735,721 | Rafferty | Feb. 21, 1956 |
| 2,854,286 | Salick | Sept. 30, 1958 |

FOREIGN PATENTS

| | | |
|---|---|---|
| 415,195 | Great Britain | 1934 |
| 622,370 | Great Britain | May 2, 1949 |
| 670,379 | Great Britain | April 1952 |